Oct. 30, 1928.
L. A. FOWLER ET AL
1,689,235
BRAKE SLACK ADJUSTER
Filed Feb. 15, 1924
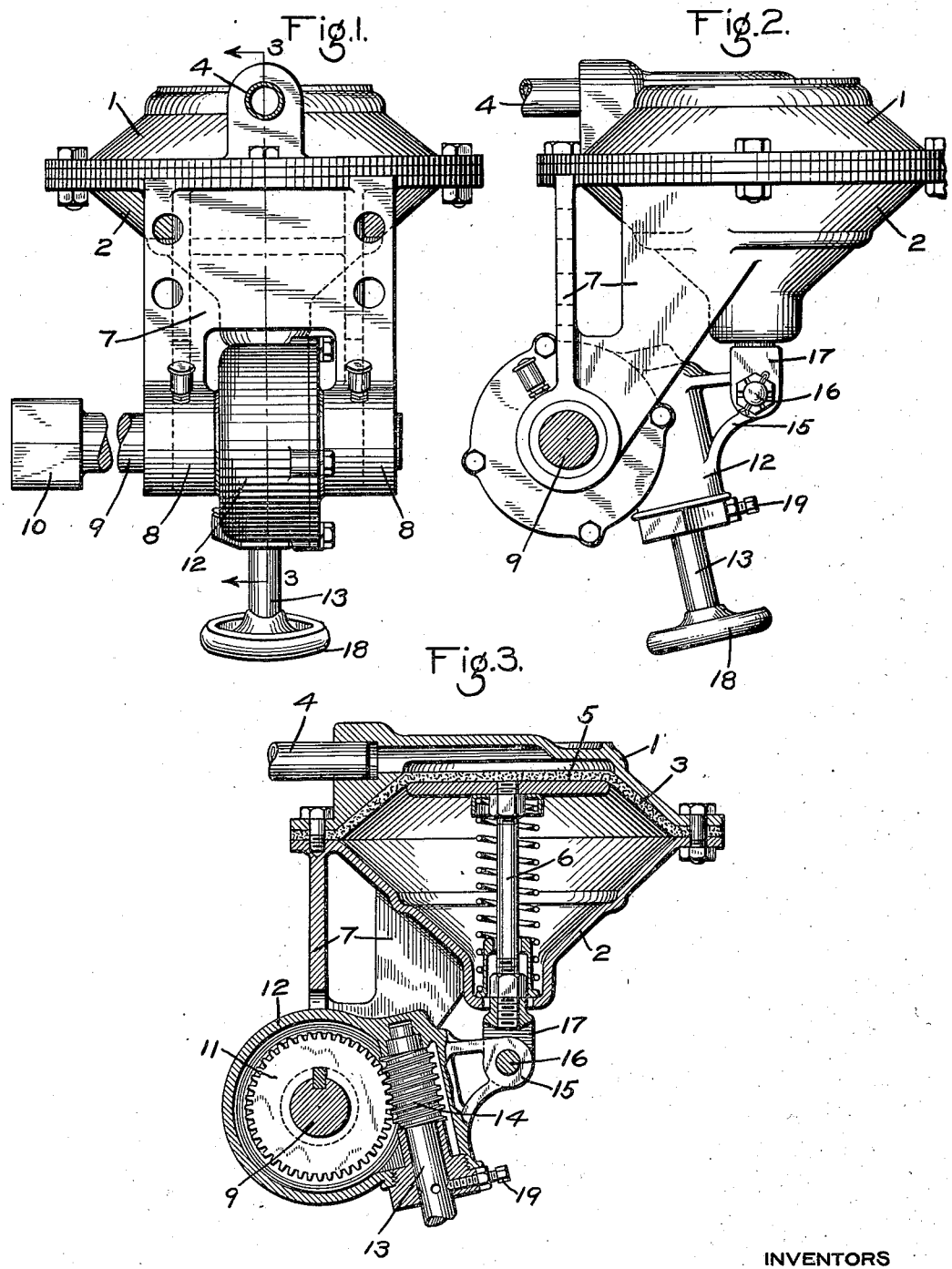
INVENTORS
LESTER A. FOWLER
AND
HENRY D. HUKILL
BY
Wm. M. Cady
ATTORNEY Patented Oct. 30, 1928.

1,689,235

UNITED STATES PATENT OFFICE.

LESTER A. FOWLER, OF OAKLAND, CALIFORNIA, AND HENRY D. HUKILL, OF PITTSBURGH, PENNSYLVANIA, ASSIGNORS TO THE WESTINGHOUSE AIR BRAKE COMPANY, OF WILMERDING, PENNSYLVANIA, A CORPORATION OF PENNSYLVANIA.

BRAKE SLACK ADJUSTER.

Application filed February 15, 1924. Serial No. 692,968.

This invention relates to brakes, and more particularly to a slack adjuster adapted for taking up the slack on a motor vehicle brake.

The principal object of our invention is to provide an improved hand operated slack adjuster of the above type.

In the accompanying drawing; Fig. 1 is a front elevation of a motor vehicle brake construction, showing our improved slack adjuster applied thereto; Fig. 2 a side elevation thereof; and Fig. 3 a section on the line 3—3 of Fig. 1.

Our improvement is shown associated with a diaphragm brake chamber comprising flanged casing sections 1 and 2 having a flexible diaphragm 3 clamped between the flanges of the casing sections. A fluid pressure supply and exhaust pipe 4 is connected to the chamber at one side of the diaphragm 3 and a pressure plate 5 engages the diaphragm at the other side. A rod 6 is secured to the plate 5 and extends out through a central opening in the casing section 2.

Preferably cast integral with the casing section 2 is a bracket 7 having spaced bearing members 8 in which the usual cam shaft 9 is rotatably mounted. Said shaft is provided with a cam 10 which is adapted upon rotation of the shaft 9 to effect the spreading of the ends of internal expanding brake heads (not shown), so that said heads will frictionally engage the internal friction face of the usual brake drum (not shown).

In order to take up slack, there is secured to the shaft 9 intermediate the bearing members 8 a worm wheel 11 enclosed in a casing 12 and mounted in said casing is a shaft 13 provided with a worm 14 adapted to mesh with the wheel 11.

The casing 12 is provided with a lug 15 which is pivotally connected by a pin 16 with a yoke 17 secured to the outer end of the rod 6. The shaft 13 may be provided with a hand wheel 18 for effecting the rotation of the shaft.

When fluid under pressure is supplied through pipe 4 to the diaphragm 3, said diaphragm is moved so as to thrust the rod 6 outwardly and the casing 12 is rotated. The worm 14, being mounted in the casing 12, rotates the casing and thus causes the rotation of the worm wheel 11 and the cam shaft 9. The rotation of the cam shaft 9 causes the rotation of the cam 10, so as to expand the brake heads in the brake drum and thus cause an application of the brakes by frictional engagement of the brake heads with the internal friction face of the brake drum.

If the slack becomes excessive, through wear of the brake heads on the brake drum, the slack may be taken up by shifting the angular position of the cam 10. This is effected by turning the hand wheel 18 so as to rotate the shaft 13. The rotation of shaft 13 rotates the worm 14 so as to turn the worm wheel 11 and the cam shaft 9. The rotation of shaft 9 shifts the angular position of the cam 10 with respect to the casing 12, so that the slack is taken up. The shaft 13 may be clamped in its adjusted position by means of a set screw 19 which, when screwed down, is adapted to engage the shaft, as shown in Fig. 3.

Having now described our invention, what we claim as new and desire to secure by Letters Patent, is:—

The combination with a diaphragm brake chamber comprising casing members and an interposed flexible diaphragm and a diaphragm rod operable by said diaphragm, of a bracket secured to one of said casing members, a cam shaft mounted in bearings in said bracket, a casing mounted on said shaft intermediate the bracket bearings and pivotally connected to said diaphragm rod, a worm wheel mounted in said casing and secured to said shaft, and a rotatable worm mounted in said casing and meshing with said worm wheel for varying the angular position of the cam shaft with respect to said casing.

In testimony whereof we have hereunto set our hands.

LESTER A. FOWLER.
HENRY D. HUKILL.